United States Patent [19]
Kehler

[11] 3,942,004
[45] Mar. 2, 1976

[54] DUAL SPACED, BOREHOLE COMPENSATED NEUTRON WELL LOGGING INSTRUMENT

[75] Inventor: Paul Kehler, South Bend, Ind.

[73] Assignee: Applied Inventions Corporation, North Tonawanda, N.Y.

[22] Filed: May 16, 1974

[21] Appl. No.: 470,542

[52] U.S. Cl. .............. 250/266; 250/269; 250/270
[51] Int. Cl.² ....................................... G01V 5/00
[58] Field of Search .......... 250/261, 264, 266, 269, 250/270

[56] References Cited
UNITED STATES PATENTS

| | | | |
|---|---|---|---|
| 3,462,600 | 8/1969 | Dewan | 250/261 |
| 3,567,935 | 3/1971 | Nagel | 250/264 |
| 3,567,936 | 3/1971 | Tittman | 250/264 |
| 3,823,319 | 7/1974 | Tittman | 250/269 |

*Primary Examiner*—Harold A. Dixon

[57] ABSTRACT

A dual spaced neutron well logging instrument and method utilizing a pair of alternately operated neutron sources and a pair of detectors, said dual spaced neutron well logging instrument being able to measure the porosity of earth formations penetrated by a borehole substantially independent of the thickness and the chemical composition of the mudcake, the cement liner, the well casing, the drilling mud and the diameter of the borehole.

12 Claims, 3 Drawing Figures

DUAL SPACED, BOREHOLE COMPENSATED NEUTRON WELL LOGGING INSTRUMENT

BACKGROUND OF THE INVENTION

1. Field of the Invention

This invention deals with well logging techniques, in particular with an improved dual spaced neutron well logging tool that is insensitive to borehole effects and insensitive to changes in the operational characteristics of the two neutron detectors.

2. Description of the Prior Art

For an evaluation of the commerical potential of an oil bearing formation, the porosity of the formation, as well as the oil saturation of the liquid filling these pores, must be known. Neutron well logging tools are suitable for the evaluation of the porosity as well as of the oil saturation, since they are strongly effected by the hydrogen content of the formation (which can be interpreted in terms of porosity) as well as to the salinity of the formation (which can be interpreted in terms of oil saturation).

The first commerical neutron logging tools simply comprised a single neutron source and a single neutron detector. The information derived by these tools was of rather limited value, since it did not separate the effects of formation porosity and formation salinity.

A second generation of neutron well logging tools utilized one source, two detectors and ratio building techniques to derive salinity independent porosity information. Such tools are very useful and widely applied at present. Although these tools substantially eliminate the salinity effects on the porosity reading, they still are responsive to borehole effects. Therefore, a third generation of neutron well logging tools was developed that contained means for the compensation of the borehole effect.

Several approaches were taken to eliminate or at least to reduce the borehole effect on the porosity reading of a neutron well logging tool. One simple way to achieve this is to design a decentralized tool with the source and detectors pressed against one wall of the borehole, as described in U.S. Pat. No. 3,521,062. On the other hand, more than two detectors can be used and the signal can be corrected for the borehole effect, as described in the U.S. Pat. No. 3,532,884 and 3,567,935.

U.S. Pat. No. 3,532,884 describes a pair of detectors used for the derivation of the ratio, and a third detector used for the correction of the ratio. U.S. Pat. No. 3,567,935 uses three or four detectors for the derivation of two ratios. The first ratio is the basic porosity indicator, whereas the second ratio is used to correct the first ratio.

Instrumentation other than neutron detectors can also be used for the correction of the neutron log. In U.S. Pat. No. 3,789,219, for example, a dual spaced gamma ray tool is used for the correction of the neutron log for the effects of the mudcake, and a borehole caliper is used for the correction of the neutron log for the effects of the borehole diameter.

SUMMARY OF THE INVENTION

The present invention deals with a dual spaced neutron well logging tool comprising two pulsed neutron sources and two detectors. With this tool, the porosity of the investigated formation is determined by the product of a ratio and an inverse ratio. The ratio is determined by dividing the counting rate of the first detector by the counting rate of the second detector during a first time interval, and the inverse ratio is determined by dividing the counting rate of the second detector by the counting rate of the first detector during a second time interval. No correction of these ratios is necessary. The product of these ratios is indicative of the formation porosity, independent of the formation salinity and independent of borehole effects.

The advantages of the present invention over the old state of the art are as follows:

First of all, a simple ratio measurement technique is needed for the porosity determination, without any compensation measurements or compensating electronic networks.

Secondly, since the determined porosity is substantially independent of borehole effects, shorter (than conventionally used) spacings between sources and detectors can be employed, thereby increasing the counting rates of the detectors. This increase in counting rate is beneficial for better statistical accuracies of the reading, higher logging speeds, or both. In conventional tools, the spacings between the source and the detectors must be kept relatively long to reduce the borehole effect to tolerable levels.

The relatively short source - dectector spacings made possible by the present invention also allow for better spatial resolution of the investigated formations.

Finally, since the invented tool is insensitive to borehole effects, there is no need to decentralize it and to perform the porosity measurement in only one angular direction. Instead, the tool can be run in the center of the well, and signals can be received from all angular directions. This not only increases the counting rate significantly, but also allows the accurate logging of extremely narrow wells that do not accomodate centralizing means.

DESCRIPTION OF THE DRAWINGS

In the drawings, the FIG. 1 illustrates how the borehole influences the porosity measurement of conventional neutron logging tools, and how these borehole effects are eliminated by the present invention. The FIGS. 2 and 3 give more detailed presentations of two specific embodiments of the present invention.

The advantages and operating principles of the invention are best understood by the principles illustrated in FIG. 1:

Figure 1:
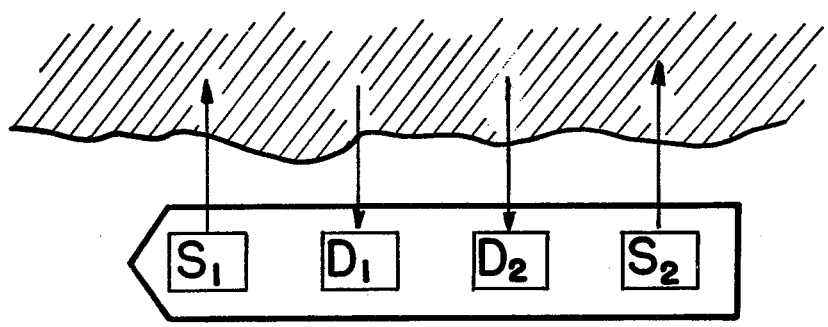

Let us first consider a very basic neutron logging tool comprising only one source and one detector, $S_1$ and $D_1$ in FIG. 1. In this example, source $S_1$ emits neutrons into an adjacent earth formation, and detector $D_1$ detects backscattered thermal neutrons. It is obvious that the neutrons leaving the source $S_1$ and entering the formation are slowed down by interfering materials such as the drilling mud or the mud cake. This reaction in the borehole effects significantly the spacial distribution of thermal neutrons in the formation and, thus, the radiation received by the detector $D_1$. Furthermore, the thermal neutrons diffusing towards the detectors are absorbed in the (normally highly saline) drilling mud surrounding the logging tool. Therefore, the porosity indication is effected by effects at both the source $S_1$ and the detector $D_1$.

In the preceding discussion, thermal neutrons were considered. Similar considerations can be made for epithermal neutrons or for thermal neutron capture gamma rays.

The situation is somewhat improved in more modern logging tools comprising one source and two detectors, for example $S_1$, $D_1$ and $D_2$ in FIG. 1. With such tools, the porosity is indicated by the ratio of the counting rates of the two detectors. Obviously, in building the ratio, the borehole effects opposite the source are eliminated. However, the borehole effects on the two detectors are still influencing the ratio and the porosity reading. A one source - two detector tool is insensitive to borehole effects in one well only in the special case where the borehole effects on the two detectors are identical. In this special case, the building of the ratio also eliminates the borehole effects on the two detectors. Even in this case, however, a correction for different diameters of different wells becomes necessary.

A similar (for symmetry reasons) situation exists in neutron logging tools comprising two sources and one detector, for example, $S_1$, $D_1$ and $S_2$ in FIG. 1. The porosity of the formation is determined with such tools by building the ratio of the counting rate during the time interval when the first source is turned on, to the counting rate in the time interval when the second source is turned on. This ratio building technique eliminates the borehole effect on the detector and — if identical conditions exist opposite the two sources — on the two sources. However, as in the preceding example, correction for the borehole diameter still is necessary.

Logging tools comprising two sources and one detector have not found practical application because of the necessity to pulse the two neutron sources. Because of their high penetration, so-called capsule neutron sources can not easily be pulsed by shielding (as is done, for example, in the gamma ray tool described in the copending application with Ser. No. 207,040). The use of two accelerator - type neutron sources, producing 14 MeV neutrons, is also unpractical because of the difficulties involved in producing two stable sources. However, by using two detectors and one source, and storing the information received by the first detector until such time when the second detector is at the same location where the first detector was located when receiving the stored pulses, the detectors receive radiation from one common zone of observation, irradiated by the neutron source from two different spacings. Such a tool is described in U.S. Pat. No. 3,784,822 and is basically equivalent to the two source - one detector tool discussed above. The need for a borehole caliper, to be used for the estimation of the borehole effects on the neutron source, is specifically pointed out in U.S. Pat. No. 3,784,822.

The invented neutron logging tool is not effected by borehole conditions and is best understood when used for the measurement of the spatial distribution of neutrons in a formation opposite the two detectors $D_1$ and $D_2$ shown in FIG. 1. A steady state - spatial distribution of neutrons in the formation is found after one of the sources $S_1$ or $S_2$ has been turned on for a sufficient length of time to establish an equilibrium between absorbed and generated neutrons. An indication of the spatial distribution of neutrons is then derived by the building of the ratio of the counting rates of the two detectors $D_1$ and $D_2$. This measurement of the spatial distribution of neutrons can be made independent of any borehole effects, as shown by the following considerations:

Be $C_{xy}$ = the real counting rate of detector $D_y$ when source $S_x$ is turned on, $F_{xy}$ = the theoretical, ideal counting rate of detector $D_y$ when source $S_x$ is turned on, for an infinite and homogeneous formation F, with no borehole effects present, and for unity source strength and unity detector efficient area, $I_x$ = the intensity (strength) of the source $S_x$, $B_x$ = the borehole effect on the source $S_x$, $E_y$ = the efficient area of the detector $D_y$, and $b_y$ = the borehole effect on the detector $D_y$.

Then, the counting rate of the detector $D_1$ during the time interval when the source $S_1$ is turned on, is $$C_{11} = F_{11}\, I_1\, B_1\, E_1\, b_1\,,$$

the counting rate of the detector $D_2$ during the same time interval is $$C_{12} = F_{12}\, I_1\, B_1\, E_2\, b_2\,,$$

and the ratio of the two counting rates is $$R = \frac{C_{11}}{C_{12}} = \frac{F_{11}}{F_{12}} \times \frac{E_1\, b_1}{E_2\, b_2}.$$

The term $F_{11}/F_{12}$ is indicative of the neutron spatial distribution, whereas $E_1 b_1/E_2 b_2$ represents the different efficiencies and borehole effects of the two detectors. The source strength and the borehole effect on the source are eliminated by the ratio building process.

Similarly, the counting rates can be defined for the time interval during which the source $S_2$ is turned on:

$$C_{21} = F_{21}\, I_2\, B_2\, E_1\, b_1$$

and $$C_{22} = F_{22}\, I_2\, B_2\, E_2\, b_2.$$

Defining as the Inverse Ratio IR the ratio of the counting rate of the second detector to the counting rate of the first detector, one finds $$IR = \frac{C_{22}}{C_{21}} = \frac{F_{22}}{F_{21}} \times \frac{E_2\, b_2}{E_1\, b_1}.$$

Again, the effect of the borehole on the source $S_2$, as well as the source intensity of the source $S_2$, are eliminated by the ratio building process. Multiplication of the ratio R and the inverse ratio IR yields $$R \times IR = \frac{F_{11}}{F_{12}} \times \frac{F_{22}}{F_{21}},$$

and the borehole effect on the two detectors, as well as the efficiencies of the two detectors, cancel out.

When the tool is designed symmetrically, i.e., when the short spacings between the sources and detectors in FIG. 1 are equal (the spacing between $S_1$, $D_1$ equals the spacing between $S_2$, $D_2$), then the ideal counting rates of these two combinations of source - detector pairs are equal and can be designated by $F_s$ (s standing for short spacing):

$$F_{11} = F_{22} = F_s.$$

Under symmetric conditions, the ideal counting rates of the long spaced source - detector pairs are also identical and can be designated by $F_1$ (1 standing for long spacing):

$$F_{12} = F_{21} = F_1.$$

Substitution of $F_s$ and $F_1$ for $F_{11}$, $F_{22}$, $F_{12}$ and $F_{21}$ in the equation for R x IR yields $$R \times IR = \left(\frac{F_s}{F_1}\right)^2,$$

which is simply the square of the ratio of the counting rates of the short spacings of the tool to the counting rates of the long spacings of the tool. This ratio is very useful for the determination of the neutron spatial distribution in the formation, and can be interpreted in terms of hydrogen content, which in turn can be interpreted in terms of formation porosity. The determination of $F_s/F_1$ is the objective of many state - of - the - art neutron logging tools. Unfortunately, not the ideal counting rates are measured by common tools, but the true counting rates which are heavily influenced by various borehole effects and by changes of the detector efficiencies.

The short mathematical derivations shown above demonstrate that, in principle, the new logging tool eliminates the borehole effects on the two detectors and two sources by a ratio and product building technique.

DESCRIPTION OF PREFERRED EMBODIMENTS

Figure 2:
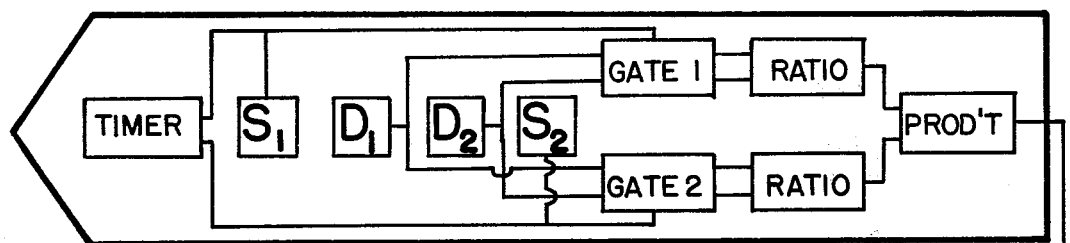
Figure 3:
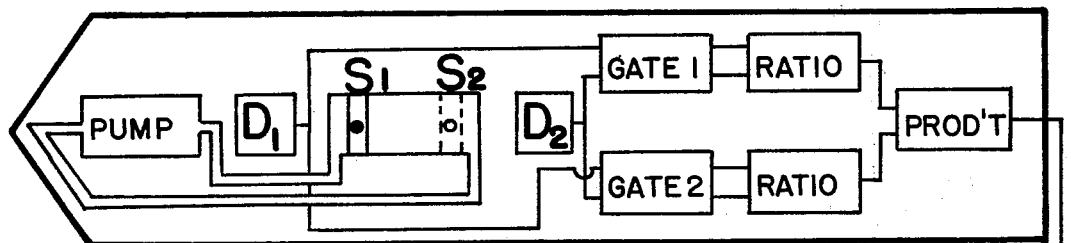

The two basic geometries possible for the new tool are shown in the FIGS. 2 and 3. In FIG. 2, two neutron detectors are straddled by two neutron sources, and in FIG. 3 two neutron source positions are straddled by two detectors.

In FIG. 2, a timer turns on alternately the sources $S_1$ and $S_2$. This is very easily done with so-called accelerator - type neutron sources producing 14 MeV neutrons by the known DT reaction. The timer also controls gate 1 and gate 2.

Both the spatial distribution of neutrons as well as the lifetime of thermal neutrons can be utilized for porosity measurements with the new tool.

When the spatial distribution of neutrons is to be utilized, the timer first turns on the source $S_1$ for a first time interval that is very long when compared to the sum of the slowing down time of the source neutrons and the decay time of the thermal neutrons in the formation. During this first time interval, the neutron distribution within the formation will come to an equilibrium, i.e., the number of neutrons lost in the formation is equal to the number of neutrons emitted into the formation by the source $S_1$. The timer also opens gate 1 during the first time interval, and this gate connects the outputs of the detector $D_1$ and the detector $D_2$ to an electronic circuit that forms the ratio of these two counting rates. This ratio is indicative of the spatial distribution of neutrons in the formation, although sensitive to borehole effects on the two detectors and to differences in performance changes in the two detectors.

As soon as source $S_1$ and gate 1 are turned off by the timer, source $S_2$ and gate 2 are turned on by the timer for a second time interval, which is substantially of the same duration as the first time interval. Gate 2 connects the outputs of the two detectors to an electronic circuit that computes the inverse ratio of the counting rates of the detectors $D_1$ and $D_2$. This inverse ratio is also indicative of the spatial distribution of the neutrons in the formation. The borehole effect and the instrumental effects on the inverse ratio are the inverse of the borehole effects and the instrumental effects of the ratio that was derived during the first time interval. Therefore, a multiplication of the ratio and the inverse ratio by the product building electronic circuit shown in FIG. 2 will eliminate the borehole effects as well as the instrumental differences of the two detectors, and indicate the true spatial distribution of the neutrons in the formation, which can be interpreted in terms of true formation porosity.

When the thermal neutron lifetime in the formation is to be utilized for the determination of the formation porosity, the timer turns on the source $S_1$ for an interval of time that is short when compared to the lifetime of thermal neutrons in the formation, or comparable to it. After source $S_1$ is turned off, and after a short delay time, the timer opens gate 1 for a first time interval that is equal to several lifetimes of thermal neutrons in the formation. Gate 1 connects the detectors $D_1$ and $D_2$ to the ratio building circuit. This ratio is indicative of the thermal neutron lifetime in the formation, although sensitive to borehole effects on the two detectors and to varying detector sensitivities.

After the neutrons in the formation have decayed, the timer turns on the source $S_2$ for an interval of time that is substantially equal in length to the interval of time during which the source $S_1$ was turned on. After source $S_2$ is turned off and after the same delay time as for source $S_1$, the timer opens gate 2 for a second time interval which is substantially equal to the first time interval during which gate 1 was open. Gate 2 connects the detectors $D_1$ and $D_2$ to the inverse-ratio building electronic circuit. This ratio is also indicative of the thermal neutron lifetime in the formation, and is also sensitive to borehole effects and instrumental differences of the two detectors. However, the borehole effect and the instrumental effects on the inverse ratio are the inverse of the borehole effects and the instrumental effects of the ratio that was derived during the first time interval. Therefore, a multiplication of the ratio and the inverse ratio by the product building electronic circuit in FIG. 2 will eliminate these effects, thereby indicating the true thermal neutron lifetime in the formation, which can be interpreted in terms of formation porosity.

For the measurement of the thermal neutron lifetime in the formation, thermal neutron detectors or gamma ray detectors sensitive to thermal neutron capture radiation can be used for the detectors $D_1$ and $D_2$.

For the measurement of the spatial neutron distribution in the formation, epithermal neutron detectors can also be used as detectors $D_1$ and $D_2$, in addition to thermal neutron detectors and to gamma ray detectors sensitive to thermal neutron capture radiation.

So-called capsule neutron sources can not be used in the embodiment shown in FIG. 2, since they can not be turned off electronically nor can they be shielded easily. However, capsule sources can be used in a logging tool in which the two sources (or rather, two source locations) are straddled by the two detectors, as shown in FIG. 3.

In this FIG. a hydraulic pump alternately positions a single capsule neutron source to the positions $S_1$ and $S_2$. The position of the source is sensed and gate 1 is opened when the source is at $S_1$, and gate 2 is opened when the source is at $S_2$. Because of the inability to shut off the source, only the neutron spatial distribution can be measured with the embodiment shown in FIG. 3, but not the thermal neutron lifetime. However, when the mechanically moved capsule source of FIG. 3 is replaced with two electronically controlled accelerator sources and a timer, the operating mode and the results of the embodiment shown in FIG. 3 are identical to those of the embodiment shown in FIG. 2, due to the symmetry of the two designs.

The embodiments of an invention in which an exclusive property or privilege is claimed are defined as follows:

1. A method for the determination of the porosity of an earth formation surrounding a borehole, utilizing a well logging tool that comprises two neutron sources and two detectors, said porosity being derived from the product of the ratio and the inverse ratio of the counting rates of the first detector and of the second detector,
    said ratio being derived by dividing the counting rate of said first detector by the counting rate of said second detector during a first time interval,
    said inverse ratio being derived by dividing the counting rate of said second detector by the counting rate of said first detector during a second time interval,
    and said first and second time intervals having a fixed relation to the time intervals during which the first neutron source and the second neutron source are turned on and are irradiating said earth formation.

2. A method for the determination of the porosity of earth formations according to claim 1, wherein
    said first neutron source is turned on and said second neutron source is turned off during said first time interval, and said second neutron source is turned on and said first neutron source is turned off during said second time interval.

3. A method for the determination of the porosity of earth formations according to claim 1, wherein
    said first neutron source is turned on and is irradiating said earth formation with a short burst of neutrons prior to said first time interval, and said second neutron source is turned on and is irradiating said earth formation with a short burst of neutrons prior to said second time interval.

4. A method for the determination of the porosity of earch formations according to claim 2, wherein
    said first and said second intervals are very long when compared to the thermal neutron life time in said formation.

5. A method for the determination of the porosity of earth formations according to claim 3, wherein
    said first and second time intervals are comparable in length to several thermal neutron life times in the formation.

6. A well logging tool for the determination of the porosity of earth formations surrounding a borehole,
    said well logging tool comprising two detectors with associated electronic circuits and two neutron sources that alternately irradiate said earth formations at different time intervals and from two different source locations relative to said two detectors.

7. A well logging tool for the determination of the porosity of earth formations according to claim 6, wherein
    said two neutrons sources that alternately irradiate said earth formations straddle said two detectors.

8. A well logging tool for the determination of the porosity of earth formations according to claim 6, wherein said two neutron sources that alternately irradiate said earth formations are straddled by said two detectors.

9. A well logging tool for the determination of the porosity of earth formations according to claim 6, wherein
    said two neutron sources that alternately irradiate said earth formations are represented by a single capsule neutron source that is moved from a first position to a second position relative to said two detecctors, and wherein both the first and the second position are straddled by said two detectors.

10. A well logging tool for the determination of the porosity of earth formations according to claim 6, wherein
    said two detectors are thermal neutron detectors.

11. A well logging tool for the determination of the porosity of earth formation according to claim 6, wherein
    said two detectors are epithermal neutron detectors.

12. A well logging tool for the determination of the porosity of earth formations according to claim 6, wherein
    said two detectors are gamma ray detectors sensitive to the gamma radiation caused by thermal neutron capture in said earth formations.

* * * * *